Figure 1:
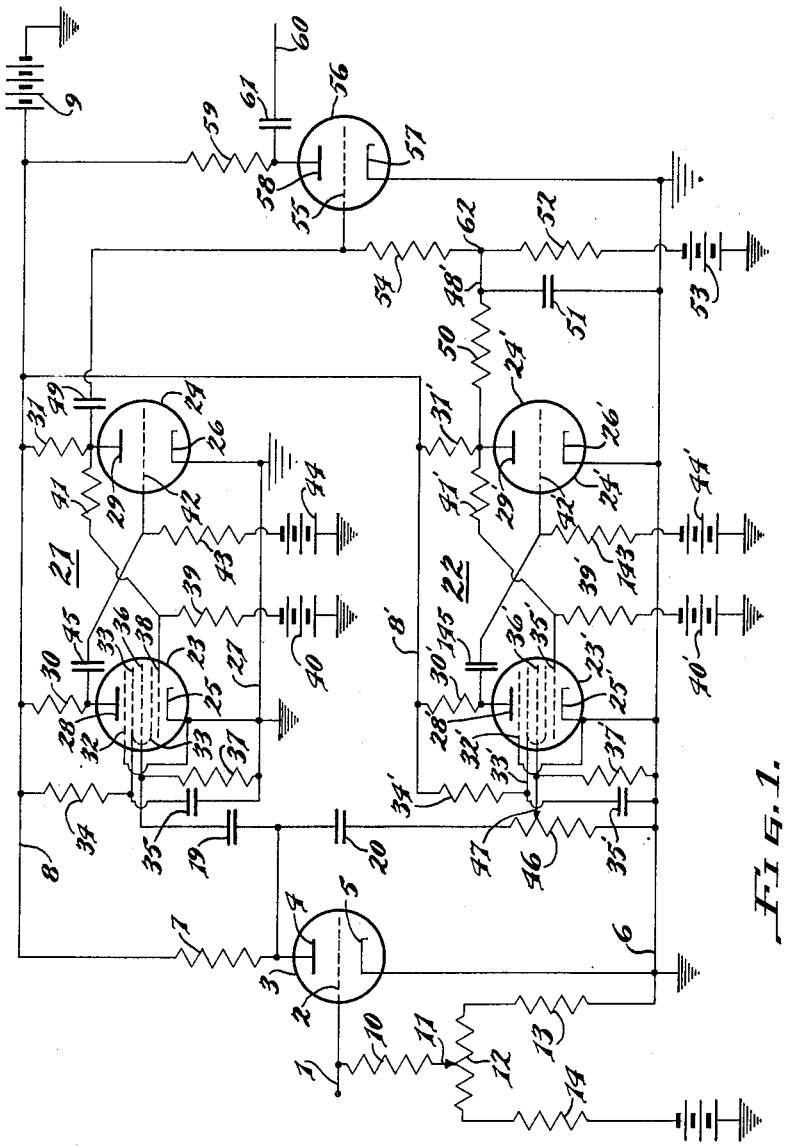

Inventors
Francis J. Davis
Leon F. Curtiss

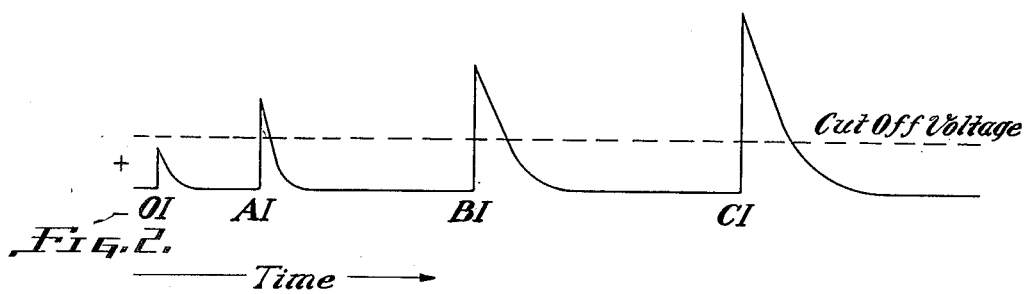
Fig. 2.
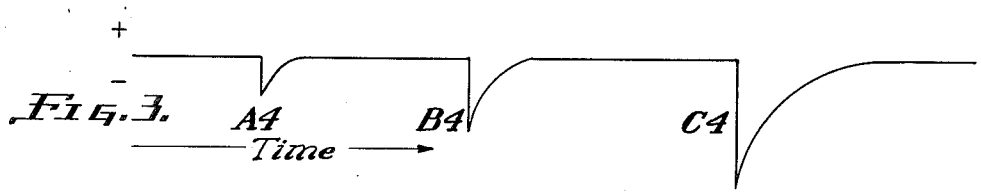
Fig. 3.
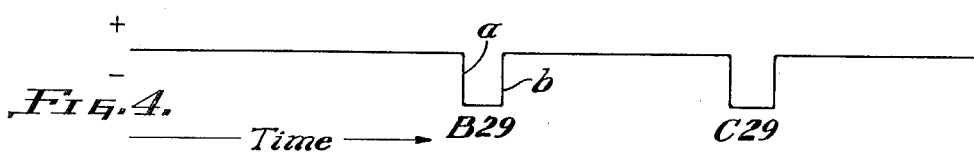
Fig. 4.
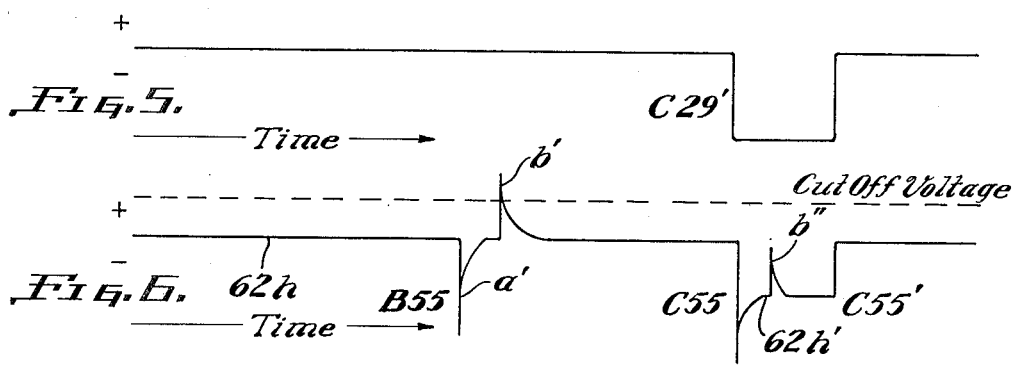
Fig. 5.
Fig. 6.
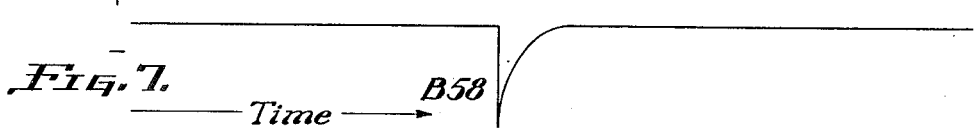
Fig. 7.
Inventors
Francis J. Davis
Leon F. Curtiss Patented May 1, 1951

2,551,529

UNITED STATES PATENT OFFICE 2,551,529

PULSE AMPLITUDE DISCRIMINATOR

Francis J. Davis, Washington, D. C., and Leon F. Curtiss, Garrett Park, Md., assignors to the United States of America as represented by the United States Atomic Energy Commission Application August 27, 1946, Serial No. 693,348

5 Claims. (Cl. 250—27)

This invention relates to an electronic device for studying the distribution of electrical pulses, and more particularly concerns a differential pulse amplitude selector or discriminator for determining how many pulses which may be of random amplitude, occur within a predetermined amplitude range.

The primary object of the invention is to provide a pulse amplitude discriminator for studying pulses, such as those resulting from the incidence of alpha particles in a Geiger-Mueller tube counter, to determine the number of pulses falling within a certain amplitude range. In the furtherance of this object, it is intended to provide an analyzing circuit into which substantially all of the pulses from a source are injected, but in which pulses of amplitudes above and below a predetermined range are eliminated and through which pulses within the scrutinized range are passed so that they may be counted.

A general object of the invention is to provide for the analysis of a pulse signal in successive stages, in the first of which stages signals of an amplitude grossly below the range of interest are excluded while all other signals are amplified and passed to two parallel channels to the second stage. In the second stage, signals, if they be of an amplitude near but below the lower end of the range of interest, are excluded from further passage through either channel, while signals between the upper and lower range limits are excluded from further passage through one channel only, and signals above the upper range limit are passed through both channels. The third stage combines the signal output of both channels in such a way that if a signal representing a pulse is passed by both channels, in which case the original pulse would necessarily have been above the range of interest, the output of one channel cancels the other whereas if a signal is passed by one channel only, and therefore represents an original pulse of an amplitude within the range of interest, then this latter signal passes through the third stage so that it may be counted.

A further object of the invention is to provide an amplitude discriminating circuit responsive only to pulses within a predetermined amplitude range and in the operation of which the upper limit of the range may be independently adjusted whereby the sensitive range may be broadened or narrowed while maintaining the same lower limit of the range. Additionally, it is proposed to provide a range selector which, while being capable of fine adjustment as to range limits and as to range width, nevertheless possesses the predictability and stability inherent in the multivibrator circuits upon which it depends.

Yet another object of the invention is to provide a differential range selector responsive to pulses not only varying in amplitude, but also varying in rate, and to provide for adjustment of the amplitude response characteristics without altering or impairing the rate of respondability.

Among the more specific objects of the invention are: the utilization of standard vacuum tubes and power supply; the utilization of but two essential controls for varying the amplitude response range; and the provision, in a circuit incorporating parallel multivibrators, for the self-setting of the multivibrators so that they will automatically recondition themselves for proper reception of the next pulse. These and other objects will appear in the following specification and drawings, in which Fig. 1 is a circuit diagram of the differential range selector; and Figs. 2 to 7, inclusive, are diagrams illustrating pulses occurring at various portions of the circuit during differentiation.

Referring first to Fig. 1 of the drawings, there is shown an input terminal 1 connectible to the above ground terminal of a source of pulses, such as the usual amplifier for a Geiger-Mueller counter. The pulse source is not shown since it is immaterial to the invention, it being sufficient to note that positive pulses of varying amplitude are fed through input terminal 1 to the grid 2 of an amplifier tube 3 which has the usual anode 4 and indirectly heated cathode 5. In the case of this and the other tubes in the circuit diagram, symbols representing the cathode heaters and heater voltage supply have been omitted for simplicity since these elements are well known in the art, it being understood that these elements are conventionally used in the disclosed circuit.

The cathode 5 of tube 3 is connected to the common ground 6 while plate 4 is connected through the plate load resistor 7 to a plate supply lead 8 which, in turn, is connected to the positive side of a source 9 of plate voltage, for example, +150 volts. While voltage source 9 has been shown as a battery it is understood that in this and similar instances throughout the specification, the power supply may be of any desired type.

The input circuit of grid 2 is comprised of a grid resistor 10 connected to the slider 11 of a potentiometer 12 which is connected on the one side through a resistor 13 to ground 6 and through resistor 14 on the other side to the negative side of a source 15 of bias voltage, such as −105 volts. Through proper adjustment of the slider 11, tube 3 may be biased below cut-off so that it does not conduct until a positive pulse of sufficient amplitude is applied to its grid 2 through input terminal 1 and the adjustment may be such that the grid bias is set to exclude pulses of amplitude grossly below the range of interest.

The output signal of tube 3 appears at its plate 4 and is simultaneously applied through coupling condensers 19, 20 to the input circuits of one-shot multivibrator units 21 and 22. Since these units are essentially the same, only one will be detailed with the understanding that where prime numerals are used to designate elements in unit 22, they are substantially similar to those in unit 21.

Multivibrator unit 21 includes two tubes having cathodes 25, 26 and plates 28 and 29, respectively, the cathodes being connected to a common ground 27 and the plates are respectively connected to plate power supply positive voltage lead 8 through plate load resistors 30 and 31. Tube 23 is of the pentagrid mixer amplifier type and is provided with a suppressor grid 32 conventionally connected to cathode 25 and a screen grid 33 connected to plate supply positive voltage lead 8 through the screen voltage dropping resistor 34 suitably bypassed to ground by condenser 35. The input circuit for unit 21 is composed of the injector control grid 36 which is returned to ground through grid resistor 37 and is connected through the coupling condenser 19 to the output signal of tube 2. The #1 control grid 38 is connected through grid resistor 39 to the negative terminal of a source of bias voltage 40, of a potential of −105 volts, and through a coupling resistor 41 to the plate 29 of tube 24. In conventional multivibrator practice, the grid 42 of triode 24 is connected through a resistor 43 to the negative terminal of a voltage source 44 of 20 volts potential and through a condenser 45 to the plate 28 of tube 25 so that the cross-connections couple a control grid of each tube with the plate of the other, the tubes having common cathode connections and similar plate supplies.

When unit 21 is first energized, plate current tends to flow in both tubes but because of the bias of the grids of tube 23, including that furnished by resistor 37, which renders it slightly more positive than the cathode 25 and also because of the negative bias on grid 42 of tube 24, tube 23 conducts first, thus lowering the voltage of plate 28. In the stable conditions, tube 23 conducts and tube 24 is at cut-off with its plate 29 at relatively high voltage so that grid 38, which is cross-coupled to plate 29 is also relatively positive. Then, when a negative pulse of sufficient intensity is supplied by tube 3 through capacitor 19 to injector grid 36, tube 23 is momentarily cut off, and a sudden rise in voltage at its plate 28 charges capacitor 45 so that grid 42 of tube 24 becomes positive, thus rendering tube 24 conductive and thereby lowering the voltage of plate 29. The excursion towards the negative by plate 29 is transmitted back through resistor 41 to the number one control grid 38 of tube 23, thus functioning together with the fixed negative bias from source 40 to maintain this latter tube in non-conductive state for a predetermined period even though the original triggering pulse on the injector grid 36 no longer is present and until the charge on capacitor 45 leaks off through resistor 43. The period of conductivity of tube 24 thus depends upon the constants of capacitor 45 and resistor 43, and when the positive charge on the capacitor leaks off, the normal negative bias from source 44 brings grid 42 below cut-off. When tube 24 returns to its normal non-conducting state, the voltage at its plate 28 rises, thus rendering the number one control grid 38 of tube 23 sufficiently positive so that conduction of tube 23 resumes and the unit returns to equilibrium.

Multivibrator unit 22 is substantially similar to unit 21 except that its input circuit connected through condenser 20 to the output of tube 3 includes a potentiometer 46 connected at one end to common ground 6 and an adjustable tap 47 connected to the injector grid 36'. The strength of the signal required to trigger unit 22 may be varied by adjusting tap 47 to thereby vary the strength of the pulse applied to grid 36'. Additionally, resistor 143 and capacitor 145 are larger than the corresponding resistor 43 and capacitor 45, thus providing for the storage of a larger charge on capacitor 145 so as to increase the time required for the charge to leak off through resistor 143, thus increasing the length of time for unit 22 to return to equilibrium after being triggered and resulting in a larger pulse output.

Tracing the progress of four successive pulses through the circuit thus far described, Fig. 2 graphically illustrates four successive positive pulses. Pulses O1, A1, B1, and C1 applied between input terminal 1 and ground 6, for purposes of the present illustration it will be assumed that pulse O1 occurred first, A1 second, B1 third, and C1 fourth, and that pulse O1 was of an amplitude grossly below the range of interest, A1 was only slightly below the range of interest, B1 was within the range, and that of C1 was above the range. Fig. 3 denotes the voltages at plate 4 of tube 3 resulting from the pulses illustrated in Fig. 2. By comparing the figures, it will be seen that pulse O1 did not alter the voltage at plate 4 since it was not of sufficient amplitude to raise the potential of grid 2 above cut-off, whereas pulses A1, B1, and C1 did raise the potential of grid 2 above cut-off and produced negative pulses of form and amplitude corresponding to those portions of pulses A1, B1 and C1 which resulted in the excursions of grid 2 above cut-off. Figs. 4 and 5 denote the voltages at the plates 29 and 29' of tubes 24 and 24' as the result of the pulses shown in Fig. 3. By comparing the figures, it will be seen that pulse A4 was not of sufficient strength to trigger either multivibrator 21 or 22; pulse B4 triggered unit 21 but was not of amplitude sufficient to trigger unit 22 because of the setting of potentiometer 46; and pulse C4 triggered both units 21 and 22. For purposes of illustration, the voltages at plates 29 and 29' resulting from the triggering action have been shown as being of substantially square wave form although actually the forms may be other than rectilinear. It is noteworthy that the negative excursion of plate 29' is of greater magnitude and of greater duration than that of plate 29 because of the greater sizes of capacitor 145 and resistor 143 with respect to capacitor 45 and resistor 43.

Referring again to Fig. 1, the output signal for unit 21 from the plate 29 is applied through a capacitor 49 to the control grid 55 of triode 56. The output signal for unit 22 is directly coupled from the voltage divider comprised of resistors 50 and 52 connected to the negative terminal of voltage source 53 of a potential of 105 volts and through resistor 54 to control grid 55 of tube 56. Triode 56 has the usual cathode 57 connected to common ground 6 and plate 58 is supplied through plate load resistor 59 with plate voltage from voltage source 9. An output terminal 60 is coupled through capacitor 61 to plate 58 of the output tube 56. Counting pulses are thus supplied by output circuit 60 to any desired electro-mechanical or electronic counter (not shown) in accordance with the combined output signals of units 21 and 22 in the following manner:

The potential of grid 55 is normally maintained below cut-off by the combined effects of the negative potential applied through resistor 52 from the bias voltage source 53 on the one hand, and the positive potential applied through resistors 50 and 31' and through plate power supply leads 9', 9 from plate voltage source 9. The potential at point 62, when substantially no current flows, is sufficiently negative to maintain grid 55 connected thereto through resistor 54 below cut-off, as indicated at 62p of Fig. 6 so that tube 56 normally does not conduct.

Before unit 21 is triggered, and while tube 24 is not conducting, the potential of grid 55 is fixed below cut-off, as indicated by the horizontal full line at the left-hand portion of Fig. 6. When unit 21 triggers from equilibrium and then returns, a negative square wave pulse at plate 29 of tube 24 accompanies the triggering as previously explained and as shown at B29 of Fig. 4. However, the output circuit of tube 24 includes capacitor 49 and is connected to point 62 of negative potential through resistor 54 so that the capacitor 49 and resistor 54 form an R—C voltage divider circuit with a relatively small time constant with respect to the square wave output of plate 29 and so that a differentiating action occurs in the voltage applied between grid 55 and its grounded cathode 57. This action is as follows: As the voltage at plate 29 drops substantially instantaneously as indicated at Fig. 4, the voltage across capacitor 49 discharges exponentially. Since the total of the voltage across the capacitor 49 plus the voltage across resistor 54 must equal the voltage between plate 29 and point 62, then it follows that at any given instant the voltage across resistor 54 will be less than the plate voltage by the amount by which the voltage across the capacitor 49, at that instant, is greater than the plate voltage. The converse is true when the voltage of plate 29 suddenly rises. Since the voltage of grid 55 follows the voltage across resistor 52 it will be apparent that this grid voltage will drop sharply, as shown by the portion $a'$ of the curve B55 of Fig. 6 in response to the negative excursion $a$ of the voltage of plate 29, as indicated in Fig. 4. Then, as the voltage of plate 29 sharply rises to normal, as indicated at $b$ in Fig. 4, the voltage of grid 55 rises sharply to above cut-off value for tube 56, as shown at 6' of Fig. 6. The dip at B58 of Fig. 7 illustrates the negative counting pulse at plate 58 in response to the rise 6' of grid 55 above cut-off.

Accordingly, pulse B4 which is of an amplitude sufficient only to trigger unit 21 produces a counting pulse in output 60. However, if a pulse such as C4 triggers both units, the square wave pulse C29' of unit 22 lowers the potential of point 62, as indicated at 62'$p$ so that the differentiation output peak $b''$ resulting from pulse C29 does not drive grid 55 to a potential above cut-off.

It will be observed that a capacitor 51 is connected between point 62 and the common ground 6. Capacitor 51 is somewhat larger than capacitor 49 so as to decouple the pulse output of circuit 48 from unit 22 thus preventing the triggering of unit 22 by pulses from unit 21. However capacitor 51 is so selected as to have only some smoothing action on the output of plate 29', as seen by comparing the lower level 62p' of pulse C55 in Fig. 6 with the lower level of pulse C29' in Fig. 5. Thus pulse C4, which is of sufficient amplitude to trigger both units 21 and 22, produces no counting pulse in output.

We claim:

1. A pulse amplitude discriminator comprising an input circuit for receiving pulses variable in amplitude characteristic, a pair of relay means in parallel with one another and connected to simultaneously respond to the pulses transmitted from said input circuit, the responses of said relay pair being adjusted such that the first relay means responds to provide an output pulse for all input pulses of an amplitude above a minimum amplitude that is less than the minimum input pulse amplitude for response of the second relay means of said relay pair, the pulse outputs of said pair of relay means being connected in opposition to each other and to an output tube to provide an output signal in response to the output pulse of said first relay means only when not simultaneously occurring with an output pulse from said second relay means.

2. A pulse amplitude discriminator comprising a pair of multivibrators in parallel with one another and having common input means, said multivibrators being sensitive to actuating pulses applied thereto and producing an output pulse upon actuation thereof, one of said multivibrators being more sensitive than the other, output means connected to said one multivibrator for transmitting output pulses produced thereby, and means connecting the output pulses of the other multivibrator in opposition to the output pulses of the one multivibrator for nullifying the transmission of the output pulse upon simultaneous actuation of both of said multivibrators.

3. A pulse amplitude discriminator comprising an input circuit for receiving pulses variable in amplitude characteristic, a pair of relay means in parallel with one another and connected to simultaneously respond to the pulses transmitted from said input circuit, the responses of said relay pair being adjusted such that the first relay means responds to provide an output pulse for all input pulses of an amplitude above a minimum amplitude that is less than the minimum input pulse amplitude for response of the second relay means of said relay pair, the output pulse from said second relay means being substantially greater in magnitude and duration than the output pulse from said first relay means, the pulse outputs of said pair of relay means being connected in opposition to each other and to an output tube to provide an output signal in response to the output pulse of said first relay means only when not simultaneously occurring with an output pulse from said second relay.

4. A pulse amplitude discriminator comprising a pair of multivibrators in parallel with one another and having common input means, said multivibrators being sensitive to actuating pulses applied thereto and producing an output pulse upon actuation thereof, one of said multivibrators being more sensitive than the other, the output pulse from the less sensitive of said multivibrators being of substantially greater magnitude and duration than the outpulse from the more sensitive of said multivibrators, output means connected to said one multivibrator for transmitting output pulses produced thereby, and means connecting the output pulses of the other multivibrator in opposition to the output pulses of the one multivibrator for nullifying the transmission of output pulses upon simultaneous actuation of both of said multivibrators.

5. A pulse amplitude discriminator comprising an input circuit for receiving pulses variable in amplitude characteristic, said input circuit having adjustable means to prevent the transmission therethrough of positive pulses of an amplitude grossly below the range of interest, a pair of relay means in parallel with one another and connected to simultaneously respond to the pulses transmitted from said input circuit, the responses of said relay pair being adjusted such that the first relay means responds to provide an output pulse or all input pulses of an amplitude above a minimum amplitude that is less than the minimum input pulse amplitude for response of the second relay means of said relay pair, the response of the second relay means being adjustable to determine the minimum input pulse amplitude sufficient to produce a pulse in its output circuit, the output pulse from said second relay means being substantially greater in magnitude and duration than the output pulse from said first relay means, said pair of relay means having combined output circuits to connect their pulse outputs in opposition to each other and to an output tube providing an output signal in response to the output pulse of said first relay means only when not simultaneously occurring with an output pulse from said second relay means.

FRANCIS J. DAVIS.
LEON F. CURTISS.

REFERENCES CITED

The following references are of record in the file of this patent:

UNITED STATES PATENTS

| Number | Name | Date |
|---|---|---|
| 2,262,838 | Deloraine | Nov. 18, 1941 |
| 2,266,401 | Reeves | Dec. 16, 1941 |
| 2,419,548 | Grieg | Apr. 29, 1947 |
| 2,434,921 | Grieg | Jan. 27, 1948 |
| 2,434,922 | Grieg | Jan. 27, 1948 |